Patented June 30, 1942

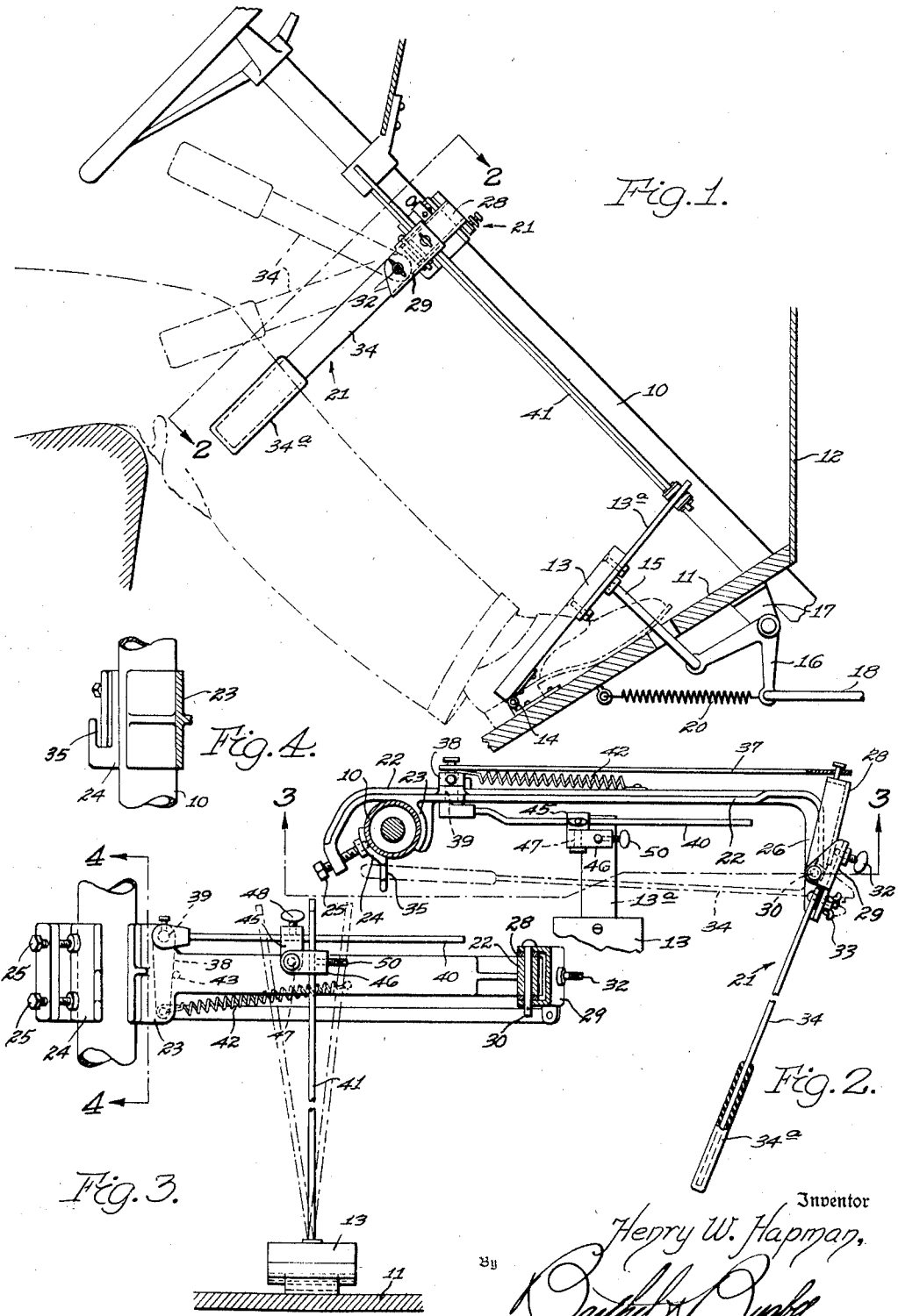

2,288,450

UNITED STATES PATENT OFFICE 2,288,450

ACCELERATOR DEVICE

Henry W. Hapman, Detroit, Mich.

Application December 16, 1940, Serial No. 370,235

4 Claims. (Cl. 74—515)

This invention relates generally to motor vehicles and more particularly to throttle or accelerator mechanism therefor.

It is an object of the present invention to provide new and improved motor vehicle throttle or accelerator mechanism of the character by which an operator may control the engine operation either by a foot throttle pedal or by a knee or leg operated throttle lever to relieve the strain and fatigue usually experienced in using the foot pedal for long periods of time.

Another object of the invention is to provide throttle or accelerator mechanism of the above mentioned character which may be adjusted such that in effect the throttle mechanism serves to govern or limit engine speed.

Another object of the invention is to provide foot and leg operated throttles which may be operated together or separately, as desired.

A further object of the invention is to provide throttle control mechanism of the above mentioned character which may be readily and easily installed in a motor vehicle without making any radical alterations in the vehicle structure.

A still further object is to provide a simple leg rest by disengaging said knee operating mechanism and operating the conventional toe operated accelerator, with knee or leg resting against said rest.

Other objects of the invention will become apparent from the following detailed description taken in connection with the accompanying drawing in which:

Fig. 1 is a fragmentary view of a motor vehicle showing my improved throttle control mechanism installed therein;

Fig. 2 is a top plan view having parts broken away and in section of the throttle control mechanism, taken along the line 2—2 of Fig. 1;

Fig. 3 is an elevational view of the throttle mechanism, taken along the line 3—3 of Fig. 2; and Fig. 4 is a view showing certain details of the mounting of the throttle mechanism and taken along the line 4—4 of Fig. 3.

Referring to the drawing by characters of reference, the numeral 10 designates a post or column of a motor vehicle steering gear, the post 10 extending through an aperture in a floor or toe board 11 which extends upwardly and forwardly to a dash panel 12. A throttle or accelerator pedal 13 is mounted on the floor board 11 by a hinge 14 and is connected by a push rod 15 to one arm of a bell crank lever 16 which is mounted on a bracket 17, rigidly secured to the underside of the floor board 11. The other arm of the lever 16 may be connected by a rod 18 to the engine carburetor (not shown). The foot throttle pedal 13 may be retracted or swung upwardly by a helical coil spring 20 which may have one end anchored to the floor board 11 and the other end secured to the lever 16.

Mounted on and rigidly secured to the steering column 19, a second throttle operating mechanism, designated in general by the numeral 21, is provided which an operator may actuate with a side movement of leg or knee to control engine operation and thus relieve leg strain occasioned by continued use of the foot pedal, usually on long trips. This knee operated throttle mechanism includes an elongated, plate-like bracket 22 which near one end thereof is provided with an arcuate socket 23 to fit against the steering post 10 and, opposite the socket 23, an arcuate and releasable socket member 24 is forced against the post 19 by a screw which is screwthreaded into the bracket 22 thus rigidly securing the bracket to the post. The bracket 22 is arranged to extend transversely of the vehicle and preferably to the right of the post 10.

The bracket 22 is provided with an outer bent end portion 26 which extends rearwardly of the vehicle and on which is fulcrumed a lever 21, arranged to be engaged and operated by the knee or leg of the operator. The lever 21 is preferably made in two parts comprising a channel lever member 28 and a second channel member 29 which freely fits over the first channel member 28 and is pivoted thereto and to the end portion 26 of the bracket 22 by a pin 30. An adjustable abutment member 32 in the form of a screw is provided and is screwthreaded into the channel member 29 for abutment with the outer side of the channel member 28. Secured to the channel member 29 by a screw and wing nut 33 is an extension or operating arm 34 which is preferably provided on its free end with a covering 34a which may be rubber or any other suitable material. The adjustment screw 32 provides for adjusting the arm 34 to a comfortable position for operation by the driver of the vehicle. By making the operating lever in two parts, the arm 34 when it is not to be used may be swung toward the bracket 22 and may be retained in a detent consisting of a notch 35 provided in a flange of the clamp member 24, see Fig. 2. Also, the screw and wing nut 33 permits the throttle operating arm to be moved to desired positions in a vertical plane relative to the channel member 29.

To the free end of the lever channel member 28 is connected one end of a push rod 37 having its other end connected to the lower end of a lever 38 which is secured to one end of a rotatable pin 39, journalled in and extending through the bracket 22 (Fig. 3). Rigidly secured to the other end of the pin 39, on the opposite side of the bracket 22 from the rod 37, there is a lever 40 which extends longitudinally of the bracket 22. The lever 40 is connected by a push rod 41 to an extension 13a of the foot pedal 13 thus establishing operative connection between the knee operated arm 34 and the throttle. A helical coil spring 42 is provided to return the operating lever to its initial or engine idling position, the spring 42 having one end anchored to the bracket 22 and having its other end secured to the lower end of the lever 38 which is limited in movement by the spring by a stop member or pin 43, see Fig. 3.

The lever 40 is connected to the push rod 41 by a pair of adjustment members 45 and 46 which are pivoted together, as at 47. The adjustment member 45 is apertured to receive and to be slidably adjustable along the lever 40 and may be held in any desired position of adjustment by a set screw 48. The adjustment member 45 also serves to change the sensitivity and range of operation of the foot pedal by the knee operated arm 34 and thus serves as a speed limiting adjustment. Similarly, the adjustment member 46 is apertured to receive the rod 41 along which the adjustment member 45 may be moved to any desired position and held against movement by a set screw 50, or entirely released.

In operation, it will be seen that the operator of the vehicle may use the foot pedal 13 but if this becomes tiresome, as it usually does on a long trip, he may use the knee operated throttle arm 34. To do this, the operator merely rests his knee against the arm 34 and swings the arm outwardly or counterclockwise, as seen facing Fig. 2, to accelerate or increase the vehicle speed. When the operator's knee is moved away from the arm 34, the spring 42, aided by the spring 20, returns the moving parts to their initial positions limited by the abutment pin 43. To limit the maximum speed of the vehicle to any desired speed it is only necessary to adjust the position of the adjustment member 46 on the rod 41 since the position of this member on the rod 41 determines the maximum travel or foot pedal depression possible through operating the arm 39. For example, if the adjustment member 46 is moved lower on the rod 41, the maximum engine speed will be decreased for full open throttle position of the knee operated arm. Thus, this adjustment provides in effect an engine governor incorporated in the throttle control itself. Also, if desired, the set screw 50 of the adjustment member 46 may be released whereby the operator may use the foot pedal entirely independent of the knee operated throttle arm and the arm 34 may be moved to an out of the way position shown in dot and dash lines of Fig. 2. Furthermore, if desired, the arm 34 may be adjusted to the dot and dash position, shown in Fig. 1, in which position it is out of the way so that the driver may get into and out of the car without striking the arm 34. It will be appreciated that with the arm 34 disconnected from the foot pedal 13, the arm can be used solely as a leg or knee rest.

While I have shown and described my invention in detail it is to be understood that the invention is to be limited only by the appended claims for many changes may be made without departing from the spirt and scope of the invention.

What I claim is:

1. Throttle operating mechanism for actuating a foot pedal throttle of a motor vehicle engine comprising, a support attachable to the vehicle, an operating lever fulcrumed on said support and arranged to be pivoted by a knee of the vehicle operator, and mechanism operatively connecting said operating lever and said foot pedal including an arm operatively connected to said lever and an adjustable slider connected to said foot pedal and slidable along said arm to different distances from the fulcrum thereof whereby to change the range of operation of said foot pedal by said lever and alter the sensitivity of operation thereof.

2. A throttle operating mechanism for actuating a foot pedal throttle of a motor vehicle having a steering post comprising, a supporting member, a bracket for securing said supporting member to the steering post and having a retaining detent, a lever fulcrumed on said supporting member, means operatively connecting said lever to the foot pedal, an operating lever fulcrumed on said supporting member and on movement in only one direction engaging and pivoting said first-named lever to actuate said foot pedal, said operating lever being movable in the opposite direction out of operating engagement with said first lever and into a position releasably engaging said retaining detent.

3. Throttle operating mechanism for actuating a motor vehicle accelerator foot pedal comprising, an elongated supporting member attachable at one end thereof to the vehicle, a manually operable lever fulcrumed on said supporting member adjacent the other end thereof, a second lever fulcrumed on said supporting member intermediate the ends thereof, a push rod connecting said levers, a third lever operatively connected to said second lever and fulcrumed on said supporting member and extending longitudinally thereof, and means for operatively connecting said third lever and the accelerator foot pedal.

4. Accelerator mechanism for operating an accelerator foot pedal for a motor vehicle having a steering column comprising, an elongated plate-like supporting member attachable at one end thereof to the steering column, a lever fulcrumed on said supporting member adjacent the other end thereof, a manually operable arm having the same fulcrum as said lever and operable to actuate said lever, a second lever fulcrumed on said supporting member intermediate the ends thereof, a rod connecting said first named lever and said second-named lever, said rod extending longitudinally of said supporting member on one side thereof, a rotatable pin supporting said second named lever and journalled in said supporting member, a third lever mounted on and secured to said pin, said third-named lever extending longitudinally of said supporting member on the opposite side thereof from said rod, and means for operatively connecting said third-named lever and the accelerator foot pedal.

HENRY W. HAPMAN.